United States Patent [19]
Parrott et al.

[11] Patent Number: 5,222,903
[45] Date of Patent: Jun. 29, 1993

[54] GAME CALL

[76] Inventors: Danny L. Parrott, 19762 Wooster Rd., Howard, Ohio 43028; Dennis C. Campbell, 23119 Ball Alley Rd., Loudonville, Ohio 44842

[21] Appl. No.: 920,806

[22] Filed: Jul. 28, 1992

[51] Int. Cl.$^5$ ............................................. A63H 5/00
[52] U.S. Cl. .................................. 446/207; 446/202; 446/208
[58] Field of Search ............... 446/207, 208, 397, 416

[56] References Cited

U.S. PATENT DOCUMENTS

| | | | |
|---|---|---|---|
| 3,656,258 | 4/1972 | Thomas | 446/208 |
| 4,050,186 | 9/1977 | Shults et al. | 446/207 |
| 4,888,903 | 12/1989 | Knight et al. | 446/207 |
| 4,915,660 | 4/1990 | Overholt, Sr. | 446/207 |
| 4,940,451 | 7/1990 | Leady | 446/208 |
| 4,950,201 | 8/1990 | Sceery | 446/207 |
| 4,960,400 | 10/1990 | Cooper | 446/207 |
| 5,019,008 | 5/1991 | Hughes | 446/207 |

Primary Examiner—Robert A. Hafer
Assistant Examiner—G. Stone
Attorney, Agent, or Firm—Oldham, Oldham, & Wilson Co.

[57] ABSTRACT

A device for a human to produce animal calls comprises: a main body with first and second ends and an intermediate portion therebetween and a longitudinal air passage therethrough from the first to the second end; a reed with a restrained end and an unrestrained end, positioned atop a portion of the air passage so that the user's breath being expelled through the air passage causes the unrestrained end to vibrate; a plate for retaining the restrained end of the reed against the main body along the intermediate portion thereof; and a generally elliptical solid piece of resilient foamed polymeric material for gripping the device between the teeth and/or lips of the human user. The device may further comprise an "O" ring frictionally engaged around the reed and the main body and compressing the reed against the main body along the respective intermediate portions of the reed and the main body. The elliptical solid piece of resilient foamed polymeric material has an aperture therethrough such that the solid piece is slidably positionable upon the plate for retaining the reed, whereupon it frictionally engages.

29 Claims, 1 Drawing Sheet

GAME CALL

The present invention relates to a device for calling animals, especially game animals, such as deer, waterfowl and the like. More particularly, the present invention relates to a device for calling animals wherein the device is able to be used in a "hands-free" mode, so that the user's hands are available to use a weapon or camera once an animal is attracted by the sound produced by the call. Even more particularly, the present invention relates to a device for calling game animals wherein the sound produced may be varied by altering the adjustment of the reed portion thereof or the proportions of the user's oral cavity.

BACKGROUND ART

It is well-known that hunters, photographers and other lovers of the outdoors like to use artificial sound-producing devices to attract the attention of the wildlife animals that they search out in the wild. The major purpose of such sound-producing devices is to draw the animal within a suitable range of the photographer's camera or the hunter's weapon, be it a handgun, a rifle or a bow and arrow. Although some of these devices are percussion type devices, the vast majority are wind instruments that use a vibrating reed to produce the sound when the user blows through the device.

As pointed out in other patents directed at the same purpose, many of the prior art devices require a skillful user in order to properly emulate the desired sound. Almost all of the prior art devices also require the skillful user to cup both hands around the portion of the device that protrudes from the user's mouth. This cupping or holding of the device is necessary to produce a proper sound, that is, a sound that is of sufficiently low frequency to attract the desired species.

A second reason for holding the devices known in the prior art is the fact that the devices have a substantial portion that protrudes from the user's mouth and the weight of the device is not comfortably accommodated by the teeth and jaws alone. This may present a substantial problem to the user who needs to hold and aim a camera or weapon. It is particularly vexing to the archer, who requires use of both hands, as well as the ability to pull the drawstring close to the face.

One such animal calling device is taught by Overholt, Sr., in U.S. Pat. No. 4,915,660, issued Apr. 10, 1990. Overholt, Sr., teaches the use of a restricted bore opening in a reed instrument to produce the desirable low tone. Although the device may not require both hands to use it, the device appears to be large enough to require at least one hand.

Many of the devices known in this art are limited to the production of a single sound and are not "tunable" to the individual user. This results in an outdoorsman being forced to carry several different devices into the field with him and to become skilled at the use of each of them. Certainly, the unskilled use of such devices will result only in scaring away the desired prey.

SUMMARY OF THE INVENTION

It is a first object of the present invention, therefore, to provide an animal calling device that may be effectively used in a "hands free" mode, that is, without need for the user to cup the hands around the device to produce the desired sound or to support the weight of the device.

It is a second object of the present invention to provide an animal calling device that does not extend any appreciable length from the user's mouth, thereby not interfering with the use of a camera, a firearm or a bow by the user.

It is a third object of the present invention to provide an animal calling device that is easy to use and that can be readily tuned to provide a variety of animal sounds.

These and other objects of the invention are achieved by a device for a human user to produce animal calls comprising: a main body having first and second ends and an intermediate portion between the ends with a longitudinal air passage through the main body from the first to the second end; a reed having a first restrained end and a second unrestrained end, positioned atop a portion of the air passage so that a user's breath being expelled through said air passage causes the unrestrained end to vibrate; a means for retaining the first restrained end of the reed against the main body along the intermediate portion of the main body; and a means for gripping the device between the teeth and/or lips of the human user. The device further may comprise a means for tuning the reed to vary the sound it produces, particularly where the means for tuning the reed comprises an "O" ring frictionally engaged around the reed and the main body and compressing the reed against the main body along the respective intermediate portions of the reed and the main body. In such a device the main body comprises, from the first end to the second end, a sound chamber portion and a mouthpiece portion. The sound chamber portion has a bore therein and the mouthpiece portion has an open channel, the bore and the channel communicated with each other and together comprising the longitudinal air passage. In a particular embodiment, the bore is generally cylindrical and the entrance to the bore at the first end of main body is unobstructed. In the particular embodiment disclosed, the open channel in the mouthpiece portion is generally semicylindrical. The bore in the sound chamber portion and the open channel in the mouthpiece portion are separated by a semicircular wall traversing said main body. In the particular embodiment disclosed, the mouthpiece portion has a lower surface adapted to rest upon the medial ridge of the tongue of the human user. The device emulates animal calls by the human user expelling air through the air passage without placement of the user's hands on or around the sound chamber portion. In a particular embodiment as disclosed, an upper surface along the intermediate portion of the mouthpiece portion is flanged outwardly to provide a seat for the edges of the reed when the reed is restrained against the mouthpiece portion. In the same embodiment, an upper surface near the second end of the main body is turned downwardly from the reed to provide an unobstructed entrance to the channel. In a preferred embodiment as disclosed, the means for retaining the first end of the reed against the intermediate portion of the main body comprises a plate having pins extending outwardly therefrom. Such a plate spans the width of the main body, so that the pins pass through the reed and seat in corresponding apertures in an upper surface of the main body. In the preferred embodiment, the reed is comprised of a flexible polyester film material, particularly the polyester film material is sold commercially under the tradename MYLAR. The preferred thickness of the reed is in the range of from about 8 to about 12 mils. Substantially all of the main body portion of the device is contained within the mouth of the human user while in use. In a preferred embodiment, the means for gripping the device between the teeth and/or lips of the human user comprises an essentially elliptical solid piece of resilient foamed polymeric material. Such a solid piece has an aperture through it such that the solid piece is slidably positionable upon the means for retaining the reed, whereupon it frictionally engages.

BRIEF DESCRIPTION OF THE DRAWINGS

The present invention will be best understood when reference is had to the accompanying drawings, wherein identical part numbers are used to refer to identical parts and wherein.

DETAILED DESCRIPTION OF THE DRAWINGS

Figure 1:
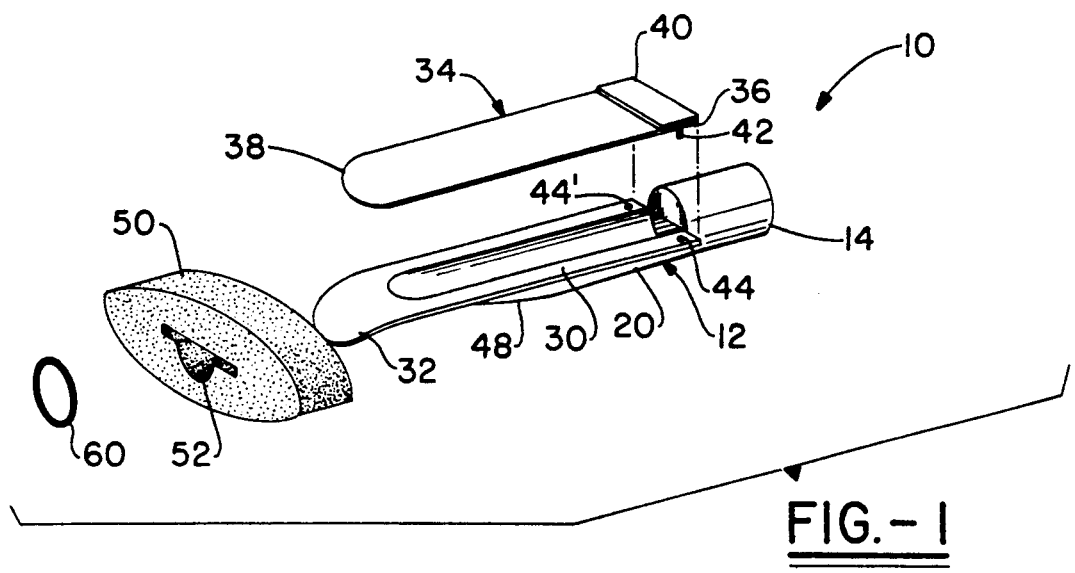
FIG. 1 shows an exploded view of the present invention game call.

The animal call 10 according to the present invention is shown in an exploded view in FIG. 1, to which attention is now directed. The animal call 10 comprises five pieces when in a disassembled condition: a main body 12, a reed 34, a reed retainer 40, a means 50 for gripping in the teeth and/or lips and a means 60 for tuning.

The main body 12 is an elongate member that has a first and a second end with an intermediate portion. Towards the first end 14, the main body 12 is generally cylindrical and has a concentric cylindrical bore 16 that effectively acts as a sound chamber 18 which protrudes through the lips and teeth of a human user to emit the sound produced therein Unlike the sound chamber taught in Overholt, Sr., U.S. Pat. No. 4,915,660, the present invention animal call 10 does not have a restriction in the sound chamber portion 18 to substantially close the bore 16, a feature which Overholt teaches as being essential to the producing a low-pitched sound without cupping of the user's hands over the device.

Moving further back along the intermediate portion 20 of the main body 12 towards the second end 22, the cylindrical first end 14 abruptly changes to an essentially semicylindrical mouthpiece portion 24, the upper half of the cylindrical bore 16 being blocked by a semicircular wall 26 that serves as a part of a seat to position the means 50 for gripping in the teeth and/or lips. The mouthpiece portion 24 may be variously shaped, so long as it has a channel 28 extending longitudinally therethrough and linearly communicating the channel with the bore 16. The upper surfaces 30, 32 of the mouthpiece portion 24 are preferably flanged outwardly to provide a seat for the reed 34 when it is properly installed. The mouthpiece portion 2 is adapted at the end where it joins the cylindrical first end 14 so that a first or restrained end 36 of the reed may be affixed thereto. As particularly shown in FIG. 1, a relatively thin plate of the same plastic material that is used to form the main body 12 may be used to secure or affix the reed 34, thereby acting as a reed retainer 40. In one version of such an embodiment, a pair of pins 42, 42', extending out of the reed retainer 40 are passed through apertures in the reed 34 or into notches along the edges of the reed 34 and seated into a pair of corresponding apertures 44, 44' in the main body 12, where the pins may be fixed in place with a common adhesive appropriate to the type of plastic used. Certainly other means for affixing the reed 34 to the main body 12 will be known to one of skill in this art. One consideration that should be made in designing such a reed retainer 40 is to allow for replacement of the reed 34, which should be viewed as an expendable piece.

Figure 2:
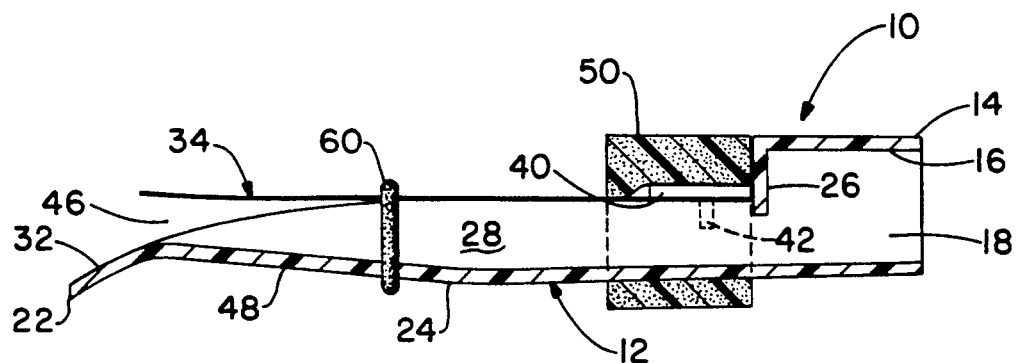
FIG. 2 shows a side view of a cross section of the assembled present invention, taken along the longitudinal axis of the main body portion thereof.

At the second end 22 of the mouthpiece portion 24, that is, the end of the mouthpiece portion adjacent the unrestrained end 38 of the reed, the upper surface 32 of the mouthpiece portion may be turned downwardly, particularly as shown in FIG. 2. This feature leaves at least a portion of the unrestrained end 38 of the reed 34 separated from the mouthpiece portion 24, so that a clear entrance 46 to the channel 28 is available. This clear entrance 46 is important to the proper vibration of the reed 34, which is results in production of the sound emulating the desired animal call.

The animal call device 1 of the present invention is intended for use with the bottom surface 48 of the mouthpiece portion 24 resting upon the tongue, especially the medial ridge of the tongue that runs from front to back and divides the tongue into symmetrical halves. For that reason, the bottom surface 48 should be smooth and somewhat adapted to the shape of the tongue, so that holding the call 10 in the mouth upon the tongue is not unpleasant.

In a preferred embodiment of the present invention, the main body 12 is typically 2.5 inches long from first end 14 to second end 22, the front sound chamber portion 18 having an outside diameter of about 0.44 inches and a length of about 0.5 inches. The mouthpiece portion 24 is about 2 inches long and about 0.5 inches wide. Although particular dimensions are presented herewith, the animal call 10 is intended to fit comfortably in the mouth of a human user and neither impede normal breathing nor present a choking hazard. Therefore, the dimensions may be varied within normal ranges so long as the functional purpose is served.

The reed 34 is a flexible piece of material that is sized to produce vibrations of the proper frequency when air is forced past the unrestrained end 38 into the channel 28. A preferred material is a plastic film, particularly a polyester such as that commercially available under the tradename MYLAR by duPont. A typical reed 34 might be about 10 mils thick, 0.5 inches wide and 1.75 inches long from front to back, with the unrestrained end 38 being rounded off to form a semicircle with a diameter equivalent to the width thereof. Near the restrained end 36, which is preferably squared off, the reed 34 has apertures therethrough or notches along the edges thereof so that the reed retainer 40 may secure the reed 34 down against the mouthpiece portion 24.

Figure 3:
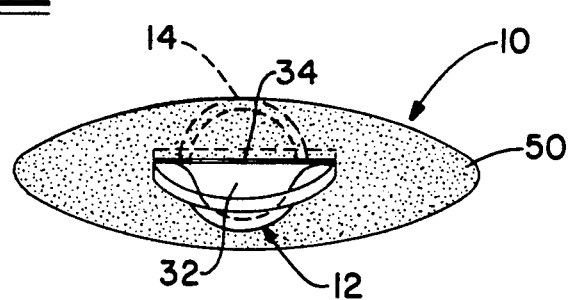
FIG. 3 shows an end view of the assembled present invention, taken from the left side of FIG. 2.

The point where the main body 12 transforms from the sound chamber portion 18 to the mouthpiece portion 24, that is, the point where the reed retainer 40 secures the reed 34 against the mouthpiece portion 24, also serves as a seat to position a means 50 for gripping the animal call between the teeth or lips of the user. Producing a proper sound requires that air not be allowed to bypass the call 10 without causing the reed 34 to vibrate. Therefore, the means 50 for gripping provides a blockage to prevent bypass air flow. A preferred means 50 for gripping is shown in FIGS. 1-3 as an essentially elliptical solid piece of resilient foamed polymeric material having a significant amount of air voids therein. Such a means 50 for gripping cushions the placement of the call between the lips or teeth of the user. It also effectively insulates the lips and/or teeth from conduction vibration set up by the animal call 10 when the reed 34 is vibrated. This insulatory effect is important in the tone quality of the sound produced, in addition to inhibiting the vibration of the teeth, which can be quite unpleasant. It also has a certain effect of cushioning the shock of a gunshot recoil, particularly a rifle shot, that would otherwise occur between clenched teeth gripping an uncushioned animal call 10.

As shown in FIGS. 1-3, the means 50 for gripping the animal call 10 has a central aperture 52 therethrough sized to allow the means 50 to slide from the second end 22 of the mouthpiece portion 24 up to the semicircular wall 26, at which point further sliding is impeded and the means 50 is frictionally engaged with the mouthpiece portion 24 atop the reed retainer 40. Typical dimensions of the elliptical solid type of means 50 for gripping shown in FIGS. 1-3 are as follows: 0.5 inches thick; 1.5 inches wide and 0.44 inches tall at the widest (central) part.

The means 60 for tuning the reed 34 allows the restrained length of the reed 34 to be varied so that the sound produced by vibrating the unrestrained portion may also be varied. For example, when the means 60 for tuning is located near the reed retainer 40 (or is completely removed), the reed 34 will vibrate along essentially its entire length, giving a relatively low frequency sound. As the means 60 for tuning is moved toward the unrestrained end 38, the length effectively vibrated decreases, increasing the relative frequency of the sound produced. In this manner, a single call 10 may be used to emulate both the grunt of a buck or the bleat of a young calf or fawn. It is also possible to emulate the calls of other animals, including waterfowl.

A preferred embodiment of the means 60 for tuning shown in the FIGURES is an elastomeric "O"-ring that is frictionally engaged around the reed 34 and the mouthpiece portion 24 so that the edges of the reed between the means 60 for tuning and the restrained end 36 of the reed are held against the upper surface 30 of the mouthpiece portion 24, effectively closing off the channel 28 along that surface and requiring entry to the channel 28 through the entrance 46.

As described herein, the animal call 10 of the present invention will be understood to be operative when it is placed in the mouth of the human user so that the bottom surface 48 of the mouthpiece portion 24 rests upon the medial ridge of the tongue and the means 50 for gripping opposes the lips and/or teeth, the sound chamber portion 18 protruding from the oral cavity only a short distance. By using the means 50 for gripping to block the mouth opening, air is expelled from the lungs through the channel 28 communicated to the sound chamber 18. The sound may be varied by either adjusting the position of the means 60 for tuning, adjusting the internal contours of the user's oral cavity, controlling the rate of air expulsion, or a combination of some or all of these.

While in accordance with the patent statutes, the best mode and preferred embodiment of the invention have been described, it is to be understood that the invention is not limited thereto, but rather is to be measured by the scope and spirit of the appended claims.

What is claimed is:

1. A device for a human user to produce animal calls comprising:
   a) a main body having first and second ends and an intermediate portion therebetween with a longitudinal air passage therethrough from said first end to said second end;
   b) a reed having a first restrained end and a second unrestrained end, positioned atop a portion of said air passage so that the user's breath being expelled through said air passage causes said unrestrained end to vibrate;
   c) a means for retaining said first restrained end of said reed against said main body along said intermediate portion thereof;
   d) an "O" ring frictionally engaged around the reed and the main body and compressing the reed against said main body along the respective intermediate portions of the reed and the main body to vary the sound produced thereby; and
   e) a means for gripping the device between the teeth and/or lips of said human user.

2. The device of claim 1 wherein the main body comprises, from said first end to said second end, a sound chamber portion and a mouthpiece portion, said sound chamber portion having a bore therein and said mouthpiece portion having an open channel, said bore and said channel communicated with each other and comprising the longitudinal air passage.

3. The device of claim 2 wherein said bore is generally cylindrical.

4. The device of claim 2 wherein the open channel in said mouthpiece portion is generally semicylindrical.

5. The device of claim 2 wherein the bore in said sound chamber portion and the open channel in said mouthpiece portion are separated by a semicircular wall traversing said main body.

6. The device of claim 2 wherein the mouthpiece portion has a lower surface adapted to rest upon the medial ridge of the tongue of the human user.

7. The device of claim 2 wherein the device emulates animal calls by the human user expelling air through said air passage without placement of the user's hands on or around the sound chamber portion.

8. The device of claim 2 wherein an upper surface along the intermediate portion of said mouthpiece portion is flanged outwardly to provide a seat for the edges of said reed when said reed is restrained against said mouthpiece portion.

9. The device of claim 8 wherein an upper surface near said second end of said main body is turned downwardly from said reed to provide an unobstructed entrance to said channel.

10. The device of claim 1 wherein the means for retaining the first end of said reed against the intermediate portion of said main body comprises a plate having pins extending outwardly therefrom, said plate spanning the width of said main body, with said pins passing through said reed and seating in corresponding apertures in an upper surface of said main body.

11. The device of claim 1 wherein the reed is comprised of a flexible polyester film material.

12. The device of claim 11 wherein the polyester film material is sold commercially under the tradename MYLAR.

13. The device of claim 12 wherein the thickness of the reed is in the range of from about 8 to about 12 mils.

14. The device of claim 1 wherein substantially all of said main body portion is contained within the mouth of the human user while in use.

15. A device for a human user to produce animal calls comprising:

a) a main body having first and second ends and an intermediate portion therebetween with a longitudinal air passage therethrough from said first end to said second end;

b) a reed having a first restrained end and a second unrestrained end, positioned atop a portion of said air passage so that the user's breath being expelled through said air passage causes said unrestrained end to vibrate;

c) a means for retaining said first restrained end of said reed against said main body along said intermediate portion thereof; and d) an essentially elliptical solid piece of resilient foamed polymeric material having an aperture therethrough such that said solid piece is slidably positionable upon the means for retaining said reed, whereupon it frictionally engages.

16. The device of claim 15 wherein the main body comprises, from said first end to said second end, a sound chamber portion and a mouthpiece portion, said sound chamber portion having a bore therein and said mouthpiece portion having an open channel, said bore and said channel communicated with each other and comprising the longitudinal air passage.

17. The device of claim 16 wherein said bore is generally cylindrical.

18. The device of claim 16 wherein the open channel in said mouthpiece portion is generally semicylindrical.

19. The device of claim 16 wherein the bore in said sound chamber portion and the open channel in said mouthpiece portion are separated by a semicircular wall traversing said main body.

20. The device of claim 16 wherein the mouthpiece portion has a lower surface adapted to rest upon the medial ridge of the tongue of the human user.

21. The device of claim 16 wherein the device emulates animal calls by the human user expelling air through said air passage without placement of the user's hands on or around the sound chamber portion.

22. The device of claim 16 wherein an upper surface along the intermediate portion of said mouthpiece portion is flanged outwardly to provide a seat for the edges of said reed when said reed is restrained against said mouthpiece portion.

23. The device of claim 22 wherein an upper surface near said second end of said main body is turned downwardly from said reed to provide an unobstructed entrance to said channel.

24. The device of claim 15 wherein the means for retaining the first end of said reed against the intermediate portion of said main body comprises a plate having pins extending outwardly therefrom, said plate spanning the width of said main body, with said pins passing through said reed and seating in corresponding apertures in an upper surface of said main body.

25. The device of claim 15 wherein the reed is comprised of a flexible polyester film material.

26. The device of claim 25 wherein the polyester film material is sold commercially under the tradename MYLAR.

27. The device of claim 26 wherein the thickness of the reed is in the range of from about 8 to about 12 mils.

28. The device of claim 15 wherein substantially all of said main body portion is contained within the mouth of the human user while in use.

29. A device for a human user to produce animal calls comprising:

a) a main body having first and second ends and an intermediate portion therebetween with a longitudinal air passage therethrough from said first end to said second end;

b) a reed having a first restrained end and a second unrestrained end, positioned atop a portion of said air passage so that the user's breath being expelled through said air passage causes said unrestrained end to vibrate;

c) a means for retaining said first restrained end of said reed against said main body along said intermediate portion thereof;

d) an "O" ring frictionally engaged around the reed and the main body and compressing the reed against said main body along the respective intermediate portions of the reed and the main body to vary the sound produced thereby; and e) an essentially elliptical solid piece of resilient foamed polymeric material having an aperture therethrough such that said solid piece is slidably positionable upon the means for retaining said reed, whereupon it frictionally engages.

* * * * *